July 14, 1959 G. R. COOK ET AL 2,894,388
ELECTROMAGNETIC TESTING APPARATUS FOR MEASURING
THE TACK OF FLUIDS
Filed May 3, 1956 2 Sheets-Sheet 1

INVENTORS
GEORGE R. COOK
LYNN E. ELLISON
BY
*Edward R. Fung*
ATTORNEY

July 14, 1959

G. R. COOK ET AL 2,894,388

ELECTROMAGNETIC TESTING APPARATUS FOR MEASURING
THE TACK OF FLUIDS

Filed May 3, 1956

2 Sheets-Sheet 2

INVENTORS
GEORGE R. COOK
LYNN E. ELLISON

BY

*Edward H. Lang*

ATTORNEY

United States Patent Office 2,894,388
Patented July 14, 1959

2,894,388

ELECTROMAGNETIC TESTING APPARATUS FOR MEASURING THE TACK OF FLUIDS

George R. Cook, Des Plaines, and Lynn E. Ellison, Crystal Lake, Ill., assignors to The Pure Oil Company, Chicago, Ill., a corporation of Ohio Application May 3, 1956, Serial No. 582,561

5 Claims. (Cl. 73—58)

This invention relates to an apparatus for determining the adhesive and cohesive properties of viscous and semi-solid fluids.

Important properties of lubricating and coating compositions include their ability to adhere to the surfaces to be lubricated or protected, and also the cohesiveness among the molecules of the composition itself. These properties are commonly referred to as tackiness, adhesiveness and cohesiveness. Methods presently available for experimentally predicting the results which can be expected of such materials under actual service conditions are unsatisfactory. We have discovered an apparatus by which these properties can be determined readily, and the results of which can be reproduced so that the effectiveness of these compositions under service conditions can be predicted with a high degree of accuracy.

In accordance with our invention, a film of the composition to be tested is placed on a surface and a metallic test plug is accurately positioned on the surface containing the film of composition to be tested. A predetermined magnetic force is applied to the test plug and the time required to lift the test plug from the film is observed. With a known current applied to the lifting magnet, the time then becomes an accurate indication of the adhesive and cohesive properties of the compostiion as compared with other compositions.

An object of the invention is to provide apparatus for testing the adhesive and cohesive properties of liquid and semi-liquid compositions.

A still further object of the invention is to provide an apparatus whereby the adhesive and cohesive properties of liquids and semi-solids can be determined by the use of magnetic force.

Figure 1:
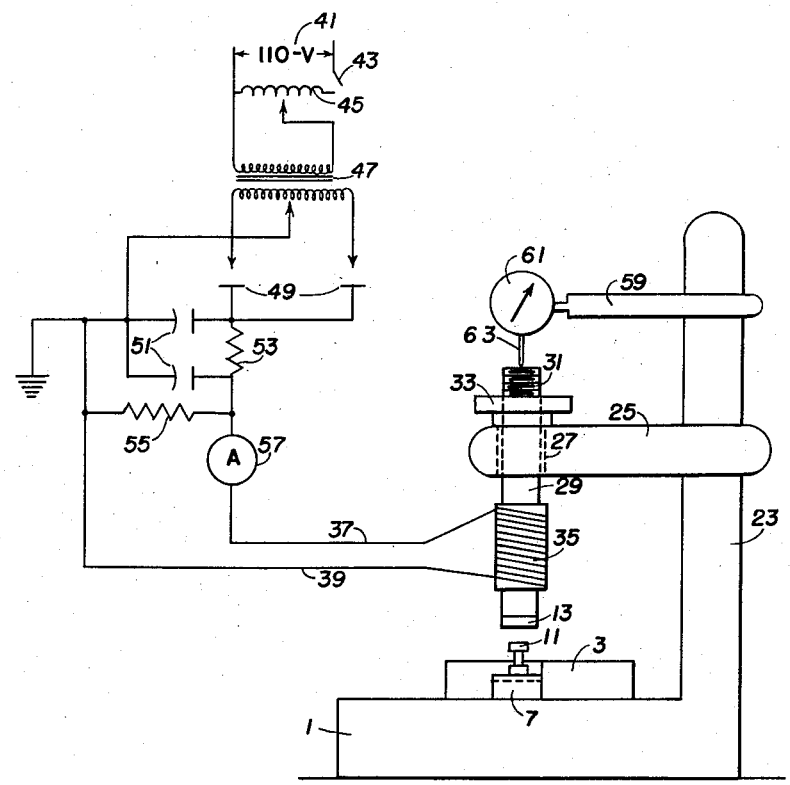
Figure 2:
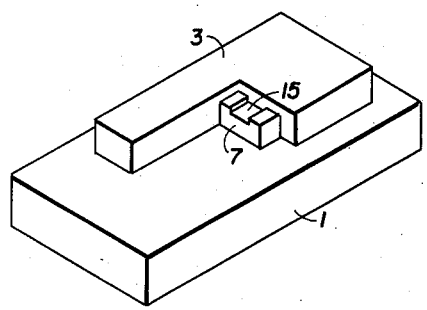
Figure 4:
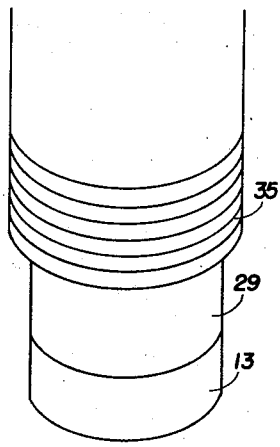
Figure 4:
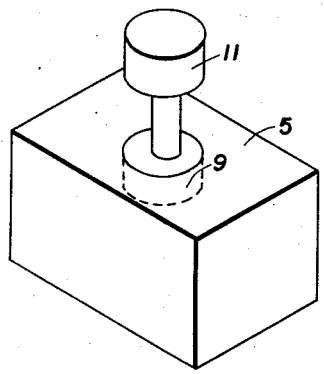
Figure 3:
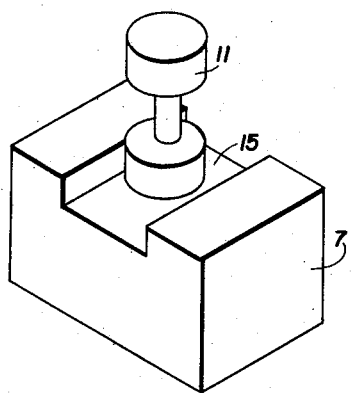
Figure 5:
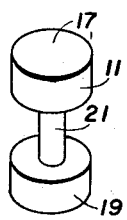

Other objects of the invention will become apparent from the following description and the accompanying drawings, of which Figure 1 is a diagrammatic, elevational view of apparatus in accordance with our invention; Figure 2 is a perspective view, looking downward, of one portion of the apparatus of our invention; Figure 3 is a perspective view, looking downward on the sample holder, test plug and magnet forming part of the apparatus of our invention; Figure 4 is a perspective view, looking downward, of the positioning block and test plug forming part of the apparatus of our invention; and Figure 5 is a perspective view, looking downward, of a test plug forming part of the apparatus of our invention.

Referring to the drawings, the numeral 1 represents a base plate which is preferably made of a non-magnetic metal, such as brass. The base plate is preferably rectangular in shape. Mounted integrally on the base plate is guide plate 3 which is generally rectangular in shape but has a corner cut out at right angles to form a guide space for the positioning block and sample holder to be subsequently described. Guide plate 3 may be fastened to base plate 1 by bolting, or by any other method which allows it to be adjusted for proper repositioning of the positioning block when necessary as, for example, when the magnet is changed or inadvertently turned. Guide plate 3 is somewhat smaller in dimension than the base plate.

Rectangular-shaped positioning block 5 (Figure 4) and rectangular-shaped sample holder 7 (Figure 3) are adapted to be placed on the base plate in the recess formed by cutting out the corner of the guide plate. The sample holder and positioning block are rectangular in shape, but preferably slightly longer in one direction than in the other, e.g., ½" x ½" x ¾". The positioning block is formed with circular recess 9 on the upper surface in order to snugly accommodate the bottom of test plug 11 and position it accurately under core tip 13. The sample holder has shallow groove 15, preferably about 0.5" x 0.005", machined across the upper face in the direction of the shorter dimension in order to hold a thin film of the composition to be tested.

The test plug is preferably formed of two identical cylindrical sections 17 and 19 joined by cylindrical section 21 of smaller diameter. The diameter of cylindrical sections 17 and 19 is somewhat less than the width of slot 15. The cylindrical sections 17 and 19 are preferably about 3/16" in diameter by 1/16" in thickness and are joined by section 21 which is preferably about 1/8" long.

Base plate 1 is formed with upright standard 23 on which is mounted supporting arm 25. Supporting arm 25 has passageway 27 drilled therethrough adjacent its outer end in order to accommodate core 29. Passageway 27 is just large enough to permit cylindrical core 29 to slide freely therein. The upper end of core 29 is threaded to accommodate adjusting knob 33. The bottom of core 29 is fitted with core tip 13 which is non-magnetic in order to mitigate residual magnetism effects when the current to the magnet is cut off. This tip is usually made of brass and is only about 0.005" thick.

Coil 35 is wound about core 29 and is connected through leads 37 and 39 to a suitable direct current electric circuit comprising source of current 41, switch 43, variable impedance means 45, power transformer 47, selenium rectifiers 49, filter capacitors 51, resistors 53 and 55, and milliammeter 57. Mounted on upright 23 is second arm 59 on the outer end of which is mounted position indicator 61 in order to indicate the distance of the bottom of the core tip from the upper surface of the test plug.

In operation, test plug 11 is placed in circular recess 9 of plug-positioning block 5 and the block is placed in position against guide block 3 under core tip 13. Recess 9 is placed in such a position in positioning block 5 that the test plug will be off-center from the core tip a sufficient disatnce to prevent the test plug from sliding when it is placed on the film of material to be tested and magnetic force is applied to it. It has been determined that the magnetic flux lines are of such shape that if the test plug is not offset a small distance from the center of the core tip, pulling force will not be in a perpendicular direction and sliding will take place, leading to erroneous and inconsistent results. In the particular apparatus shown and described, with sample block and test plug having the dimensions shown and the core tip having a radius of 3/16", the vertical axis of the test plug should be 1/8" off-center from the central axis of the core tip. The correct positioning of the test plug is accomplished by placing the circular recess of the positioning block at a location on the surface of the block such that the plug will be 1/8" off-center. The core tip is sufficiently large so that the entire upper surface of the test plug will be in contact with the core tip when attracted by magnetic force during the test.

After the test plug has been properly positioned, the current is turned on and the magnetic force exerted by the electro-magnet raises test plug 11 from positioning block 5. With current on, core 29 is raised by turning adjusting knob 33 a sufficient amount to permit removal of positioning block 5 without disturbing the plug. Positioning block 5 is then replaced by sample-holder block 7. Before mounting the sample holder, the sample is applied to shallow slot 15 and any excess material is removed from the holder by drawing a straight metallic edge over the surface of the block in the direction in which the slot runs. The film of material to be tested will then be substantially the same depth as the slot, namely, .005". The core is then lowered by turning the knob until the bottom of test plug 11 just touches the surface of the sample. It will be understood that slot 15, when the sample holder is in place, will be immediately below the test plug. When the bottom of the test plug just touches the surface of the sample the current is turned off and the position of the pointer indicator is set at zero with contact member 63 just touching the top of core 29. The contact member is operatively connected to the pointer and the indicator is equipped with means for adjusting the dial to zero setting. The test plug is allowed to rest on the surface of the sample for a soaking period of approximately 30 seconds or any other standardized period. The time should be sufficient to allow any magnetism remaining in the core to be dissipated after the power is turned off. The core is then raised a predetermined distance from the upper face of the test plug as, for example, 0.15" as indicated by position indicator 61. A second soaking period is allowed during the period that the core is adjusted to the correct testing height. This period may be standardized at approximately 60 seconds. At the end of this period switch 43 is closed, energizing the magnet, and at the same time a timer is started. A predetermined current is allowed to flow through the line to the coil surrounding the magnet as, for example, 10 milliamperes. The time required for the test plug to be lifted from the sample is noted and recorded as "break time in seconds." It will be apparent that a suitable timing device can be connected directly in the electric circuit so that it will go on and off as switch 43 is turned on and off. In this manner, by closing the switch at the beginning of the test and opening it immediately upon the test plug breaking from the surface of the test sample, the time can be accurately determined.

It is desirable to repeat the test a sufficient number of times to insure the accuracy of the results obtained.

We have found the shape of the test plug to be a critical factor in order to avoid endwise rotation of the plug in the magnetic field. The shape of the plug hereinbefore described will prevent such rotation.

Although the test apparatus may vary as to dimensions, a device utilizing positioning block, sample holder and test plug of the dimensions shown in the drawing will give excellent results. It will be apparent that the test plug must be made of steel or other magnetic metal or alloy, and the sample holder of bronze or other non-magnetic material. The base plate need not be of non-magnetic material, and may be made of magnetic material, such as cast iron. The magnetic path is broken by arm 25, which is made of brass or other non-magnetic material. The positioning block is also non-magnetic. The current to be applied to the electro-magnet and the distance which the electro-magnet is raised above the test plug for the test will depend in some measure upon the size and weight of the test plug. With a plug of the size shown and weighing approximately 0.486 gram, a current of 10 milliamperes and a distance of 0.15" creates sufficient force to raise the test plug within a reasonable period of time.

In order to demonstrate the efficacy of the device in accordance with our invention, four different gear oil lubricants were subjected to tests using an electro-magnet amperage of 10 milliamperes and a space of 0.15" between the upper face of the test plug and the bottom face of the core tip. The viscosity of the four different samples tested and the results obtained are given in the following table. From the results obtained it was concluded that Blend 3 possessed adhesive-cohesive properties superior to those of the other three samples. The concurrence of results obtained in the five runs is considered excellent for this type of test.

*Table I*

| Blend No. | Viscosity (SUS @ 210° F.) | Break-Time (Seconds) | | | | | |
|---|---|---|---|---|---|---|---|
| | | Run 1 | Run 2 | Run 3 | Run 4 | Run 5 | Average |
| 1 | 1,056 | 65.2 | 63.0 | 65.5 | 59.0 | 66.0 | 63.74 |
| 2 | 1,114 | 66.0 | 64.0 | 69.0 | 70.5 | 70.2 | 68.00 |
| 3 | 1,063 | 88.0 | 97.0 | 82.0 | 94.2 | 91.0 | 90.44 |
| 4 | 1,196 | 76.5 | 70.8 | 65.2 | 74.5 | 64.6 | 70.32 |

For comparative purposes, "break-times" are usually considered in relation to viscosity because the higher the viscosity of a material, the higher is any "norm" break-time selected as a reference level.

We claim:

1. A testing device for determining the adhesive and cohesive properties of fluids comprising a test plug of a magnetizable metal having substantially identical cylindrical top and base portions connected by a neck of substantially smaller cross-section, a test plug positioning member, an electro-magnet with a vertically adjustable core, a sample holder, means for accurately positioning said sample holder and test plug positioning member beneath said magnet with said test plug aligned with the field of the magnet for non-slipping vertical movement thereby and means for adjusting the vertical distance of said magnet from said test plug.

2. A device in accordance with claim 1 in which said sample holder is formed with a shallow groove across its upper face to hold the sample of fluid to be tested, said groove being sufficiently large to accommodate the base of the test plug.

3. A device in accordance with claim 1 including means for adjusting and measuring the current for energizing said electro-magnet.

4. A device in accordance with claim 3 in which said means for positioning the sample holder and test plug positioning member comprises a guide block mounted on a flat surface, said test plug positioning member being a removable block adapted to fit against said guide block, with a recess, conforming in size and shape to the base of said test plug, in the upper surface thereof.

5. A device in accordance with claim 4 in which the means for adjusting the distance between the magnet and plug includes an indicator having a dial, contact member and pointer, said contact members being operatively connected to said pointer and being positioned to contact the top of the core of the electro-magnet.

References Cited in the file of this patent

UNITED STATES PATENTS

| | | |
|---|---|---|
| 1,341,431 | Morrow | May 25, 1920 |
| 1,527,409 | Hassel | Feb. 24, 1925 |
| 2,070,862 | Healy | Feb. 16, 1937 |
| 2,345,968 | Green | Apr. 4, 1944 |
| 2,675,222 | Clark | Apr. 13, 1954 |
| 2,677,275 | Dabrowski | May 4, 1954 |